United States Patent [19]

Sekiya et al.

[11] Patent Number: 4,464,669

[45] Date of Patent: Aug. 7, 1984

[54] THERMAL PRINTER

[75] Inventors: Kunihiko Sekiya; Mamoru Mizuguchi, both of Yokohama; Takashi Ohzeki, Kawasaki, all of Japan

[73] Assignee: Tokyo Shibaura Denki Kabushiki Kaisha, Kawasakioshi, Japan

[21] Appl. No.: 388,976

[22] Filed: Jun. 16, 1982

[30] Foreign Application Priority Data

Jun. 19, 1981 [JP] Japan .................................. 56-94639
Jun. 19, 1981 [JP] Japan .................................. 56-94640

[51] Int. Cl.[3] .............................................. G01D 15/10
[52] U.S. Cl. ................................ 346/76 PH; 400/120
[58] Field of Search ........................... 346/76 PH, 1.1; 219/216; 400/120; 358/296

[56] References Cited

U.S. PATENT DOCUMENTS

| | | | |
|---|---|---|---|
| 4,070,587 | 3/1976 | Hanakata | 307/141 |
| 4,149,171 | 1/1978 | Sato et al. | 346/1 |
| 4,219,824 | 1/1979 | Asai | 346/76 PH |
| 4,224,869 | 9/1980 | Morin | 346/76 PH |
| 4,284,876 | 8/1981 | Ishibushi et al. | 346/76 PH |
| 4,355,319 | 10/1982 | Takeruchi et al. | 346/76 PH |
| 4,376,942 | 3/1983 | Toth et al. | 346/76 PH |

FOREIGN PATENT DOCUMENTS

| | | |
|---|---|---|
| 51-16935 | 2/1976 | Japan . |
| 52-9442 | 1/1977 | Japan . |
| 55-48631 | 12/1980 | Japan . |

OTHER PUBLICATIONS

Hatabe et al., Conference of the Institute of Electronics and Communication Engineers of Japan, Paper No. 981, (Mar. 1980).

*Primary Examiner*—E. A. Goldberg
*Assistant Examiner*—Todd E. DeBoer
*Attorney, Agent, or Firm*—Banner, Birch, McKie & Beckett

[57] ABSTRACT

High speed printing can be attained without loss of printing quality. The amount of energy to be supplied to each heating resistor in the next printing cycle is determined by the amount of energy which was supplied to it during the previous cycle of printing, as well as by the density of picture data to be printed. Other information which may be taken into account in adjusting the amount of energy supplied to the heating resistors includes the amount of energy previously supplied to adjacent resistors and the duration of the printing cycle (where this is variable).

12 Claims, 18 Drawing Figures

THERMAL PRINTER

BACKGROUND OF THE INVENTION

This invention is a thermal printer which is suitable for high speed printing with high quality.

Thermal printers have come into widespread use in various types of printers including those incorporated in facsimile equipment for recording picture images. Conventional thermal printers have a number of heating resistors arranged in a row on a substrate. These resistors are cyclically heated by selectively supplying electric current according to picture data. An image is recorded on a heat-sensitive paper which faces the heating resistors while the paper is moved in the direction perpendicular to the resistor array. While this kind of thermal printer is characterized by absence of noise, clean recording and ease of maintenance, a less desirable feature has been the difficulty of raising the speed of printing due to the heat-storage effect of the heating resistors. If, that is to say, the duty cycle is shortened in order to achieve high speed, heat is accumulated in the resistors since electrical current is repeatedly applied to the resistors before the heat generated in the previous cycle has been dissipated, so that the temperature continues to rise. Since the amount of heat accumulated in the resistors is different for each one depending on the picture data, this leads to a lack of uniformity in printing density. Further, the fact that the heat of the previous cycle remains up to the next cycle can lead to darkening of the heat-sensitive paper in places where there are space data, that is, where there should be no such darkening, so that ghost images appear.

In order to solve this problem, a method has been proposed whereby, for each heating resistor, if mark data arrive continuously in the picture signal data, the duty cycle (current passage time or pulse width) is made shorter than if mark data arrive after space data (Japan Patent Publication 55-48631). Realizing the principle, the method requires at least five gate circuits for each heating resistor which may number as many as 1000 to 2000. The thermal printer according to the prior art has, therefore, defects in that it is complicated, costly and not compact.

SUMMARY OF THE INVENTION

It is an object of the present invention to provide a thermal printer overcoming the disadvantages of the conventional printer by utilizing a simpler circuit.

It is a further object of the present invention to provide a thermal printer having a compact size.

It is a further object of the present invention to provide a thermal printer whereby high-speed printing can be attained while maintaining a high printing quality, especially for picture image printing.

According to the present invention, a plurality of resistors for generating heat are arranged in a line on a substrate. A power source supplies the heating resistors with electric power. The power source is connected to one end of each of the heating resistors via a drive circuit. The drive circuits are controlled by energy code signals which indicate the amount of electric energy to be supplied to each resistor from the power source. The energy codes for each heating resistor are stored in a memory which is written afresh for each printing cycle. The energy codes indicating the amounts of energy to be supplied to each heating resistor in the upcoming cycle of printing are determined by a logic circuit, based at least on (1) the energy codes which are stored in the memory and already used for printing in the previous cycle of printing, and (2) picture data to be printed in the upcoming cycle of printing. A second control circuit controls the timing of reading the enery codes from, and writing them into, the memory. The second control circuit also controls the timing of supplying the energy codes which have been read out from the memory.

DETAILED DESCRIPTION OF THE PREFERRED EMBODIMENT

Figure 1:
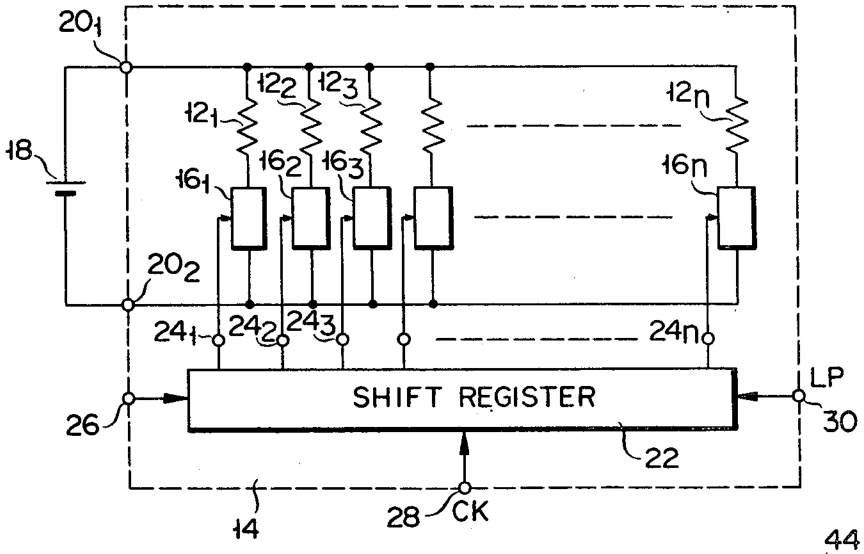
FIG. 1 is a block diagram showing an embodiment of a thermal head incorporated in a thermal printer of the invention.

FIG. 1 schematically shows a printing head incorporated in one embodiment of the invention. A plurality of heating resistors $\mathbf{12}_1$, $\mathbf{12}_2$, - - - $\mathbf{12}_n$ are arranged in a line on a substrate 14 made of a ceramic material. The number of resistors may be 1000 to 2000 or more. A plurality of drive circuits $\mathbf{16}_1$, $\mathbf{16}_2$, - - - $\mathbf{16}_n$ are provided on substrate 14, each drive circuit being connected in series with one of the heating resistors. A power source 18 such as a voltaic cell is connected to a pair of power terminals $\mathbf{20}_1$ and $\mathbf{20}_2$ between which are connected the sets of heating resistors and drive circuits. An n-bit shift register 22 is provided on substrate 14. Output terminals of each shift stage $\mathbf{24}_1$, $\mathbf{24}_2$, - - - $\mathbf{24}_n$ are connected to drive circuits $16_1$, $16_2$, - - - $16_n$ to control the drive circuits. The drive circuits have a gate function for selectively supplying direct current from power source 18 to the resistors according to the gating signals from the shift register. Gating signals consisting of 1's and 0's (which respectively correspond to "mark" and "space" in the picture) are supplied to shift register 22 through an input terminal 26. Shift register 22 is driven by clock pulses CK supplied to it from a terminal 28.

The shift register also has a latch function. After a set of data to be printed is shifted into the register, a latch pulse is needed to cause drive circuits 16 to drive the heating resistor 12. The latch pulses are supplied through terminal 30. When the first latch pulse arrives, those drive circuits corresponding to stages of the shift register which hold a "1" are enabled to apply power to their heating resistors. The other drive circuits remain disabled. While power is being applied to the heating resistors, the next set of data is shifted into the shift register. When the next latch pulse arrives, drive circuits are enabled in accordance with this new data. The bits from the shift register are therefore "latched," or maintained, during the time between latch pulses.

When n bits of printing data have been moved serially into shift register 22 by clock pulses CK, all mark bits (1's) among output terminals $24_1$, $24_2$, - - - $24_n$ selectively open the gates of the corresponding drive circuits $16_1$, $16_2$, - - - $16_n$. Electric current from power source 18 is supplied to the selected heating resistors to generate heat. The heated resistors print marks in a line along the resistor array on a heat sensitive paper (not shown) which faces the heating resistors while it is moved in a direction perpendicular to the resistor array. After one line of marks is printed, another set of printing data is supplied to shift register 22; and a similar printing cycle is repeated for printing each following line while the heat-sensitive paper is moving.

Figure 2:
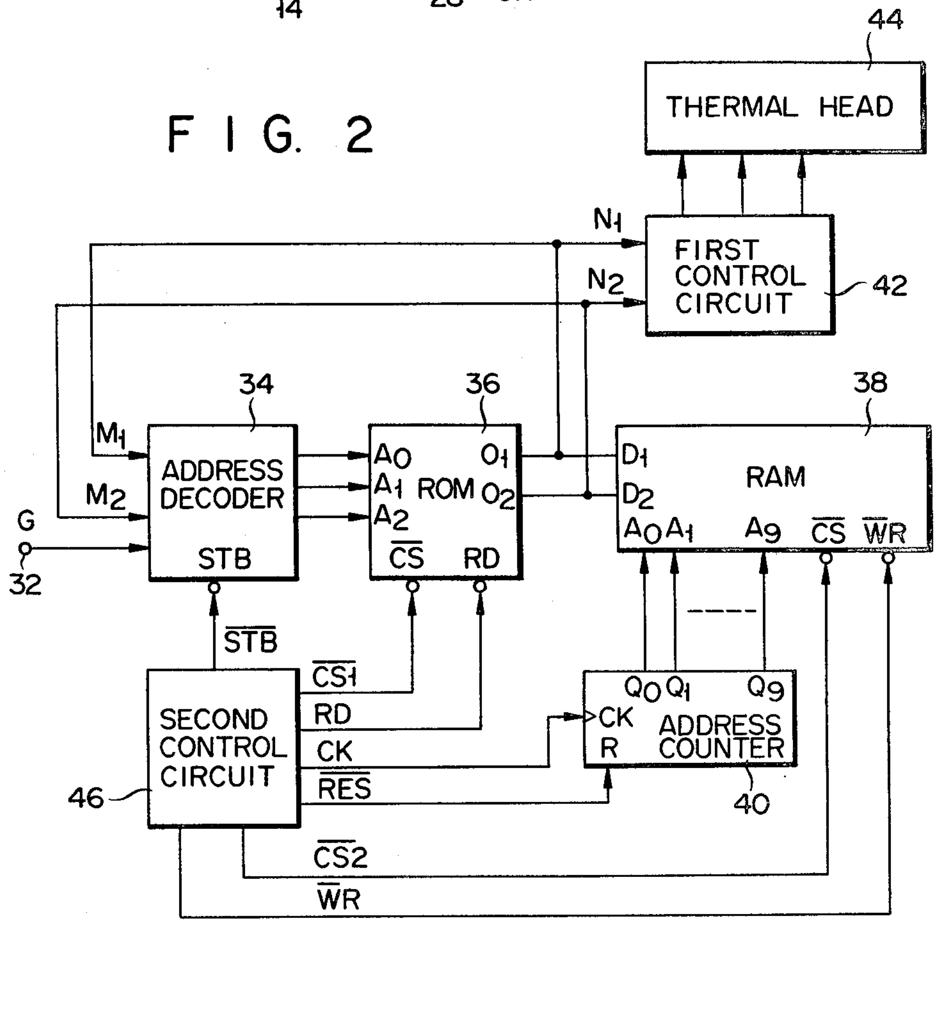
FIG. 2 is a block diagram showing an embodiment of the thermal printer according to the present invention.

The amount of electric energy to be supplied to each of the resistors is determined by taking into consideration the amount which was supplied to each resistor during the previous printing cycle. FIG. 2 shows the whole system of a thermal printer according to the invention in which the amount of energy for each of n heating resitors is determined. Input information G in binary digital form are serially provided from a data input terminal 32 to an address decoder 34. Address decoder 34 also receives as input signals an energy code ($M_1$, $M_2$) from the previous printing cycle. The energy code ($M_1$, $M_2$) is a 2-digit binary code representing the amount of electrical energy which was supplied to a given heating resistor during the previous printing cycle. Address decoder 34 converts its input into 3-digit address codes (G, $M_1$, $M_2$) and supplies them to a read only memory 36 (hereinafter referred to as ROM). ROM 36 stores output codes ($O_1$, $O_2$) in addresses designated by the address codes (G, $M_1$, $M_2$). Output codes ($O_1$, $O_2$) are also 2-digit binary codes representing electrical energy. A relationship (shown in Truth Table (1)) is established between the address codes (G, $M_1$, $M_2$) and the output codes ($O_1$, $O_2$) of ROM 36.

TRUTH TABLE (1)

| G | $M_1$ | $M_2$ | $O_1$ | $O_2$ |
|---|---|---|---|---|
| 0 | 0 | 0 | 0 | 0 |
| 1 | 0 | 0 | 1 | 1 |
| 0 | 1 | 0 | 0 | 0 |
| 1 | 1 | 0 | 0 | 1 |
| 0 | 0 | 1 | 0 | 0 |
| 1 | 0 | 1 | 0 | 1 |

TRUTH TABLE (1)-continued

| G | $M_1$ | $M_2$ | $O_1$ | $O_2$ |
|---|---|---|---|---|
| 0 | 1 | 1 | 0 | 0 |
| 1 | 1 | 1 | 1 | 0 |

Output codes ($O_1$, $O_2$) of ROM 36 are next stored in a random access memory 38 (hereinafter referred to as RAM) in addresses designated by address counter 40. As explained later, these output codes ($O_1$, $O_2$) are then read out from RAM 38 and supplied to a first control circuit 42 as an energy code ($N_1$, $N_2$) which should be printed in the subsequent printing cycle. Control circuit 42 controls the thermal head 44 by driving shift register 22 of FIG. 1 as explained later. A second control circuit 46 controls the operation of address decoder 34, ROM 36, RAM 38 and address counter 40.

Figure 3:
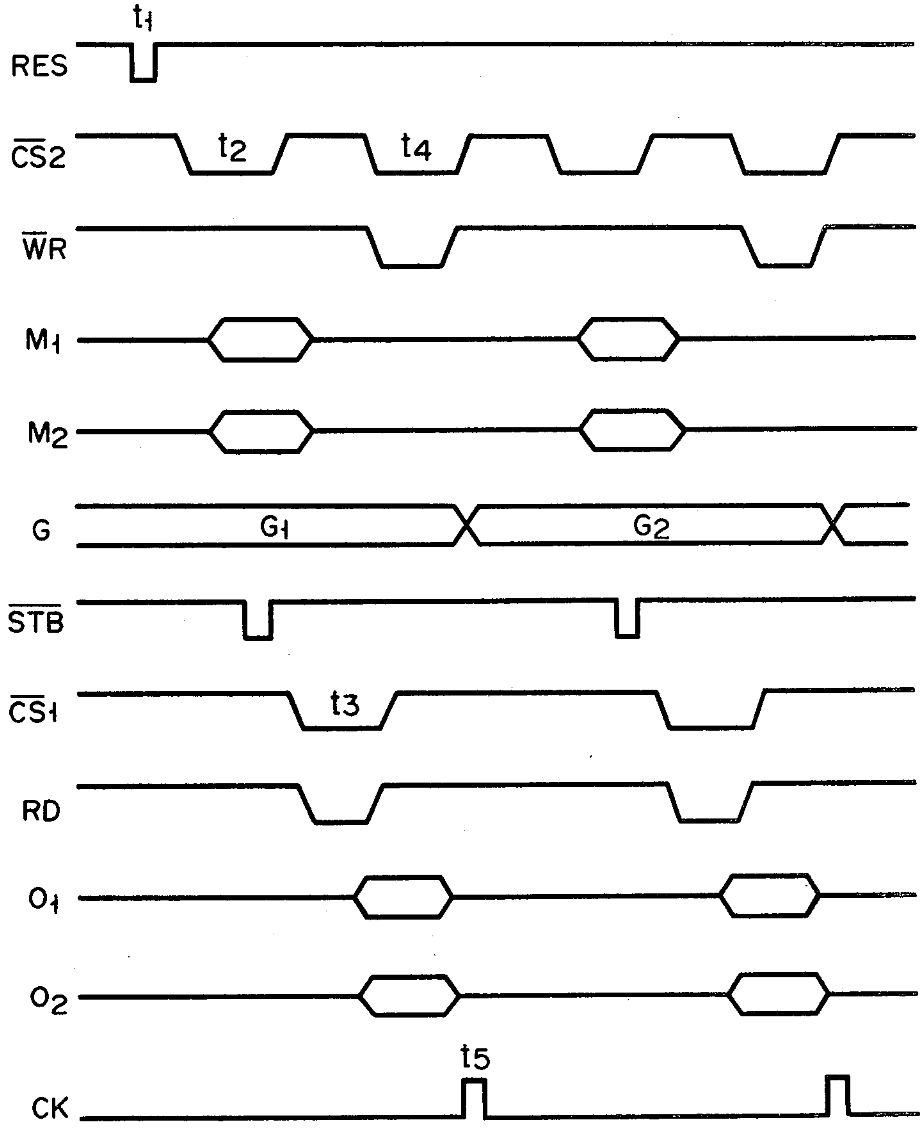
FIG. 3 is a time chart illustrating the operation of the thermal printer of FIG. 2.

Operation of the system shown in FIG. 2 is explained referring to the time chart of FIG. 3. RAM 38 is set to a read-out mode by write/read switching signal $\overline{WR}$ and a reset signal $\overline{RES}$ is supplied, at time $t_1$, to address counter 40. The address counter designates by its output signal $Q_o$, $Q_1$, - - - $Q_9$ the "0" address of RAM 38. The contents of the "0" address are read out at time $t_2$ in response to a chip select signal $\overline{CS2}$ (which selects RAM 38), and supplied to address decoder 34 as the energy code ($M_1$, $M_2$) of the previous cycle. Code ($M_1$, $M_2$) is latched by address decoder 34 together with a first bit $G_1$ of incoming information signal G when a strobe signal $\overline{STB}$ is supplied from second control circuit 46. The address designation of ROM 36 is carried out by means of the output data of address decoder 34, and the content of this address is read out, at time $t_3$, under the control of the chip select signal $\overline{CS1}$ (which selects ROM 36) and a read-command signal RD. Output code ($O_1$, $O_2$) of ROM 36 is written into the "0" address of RAM 38, at time $t_4$ in response to the chip select signal $\overline{CS2}$ and the read/write switching signal $\overline{WR}$ which has set RAM 38 to the writing mode. At time $t_5$, one clock signal CK is sent to address counter 40 designating the "1" address of RAM 38; and a similar operation is repeated for a second bit $G_2$ of incoming information G. Thus, for further bits of input information $G_3$, $G_4$ - - -, $G_n$ (not shown), the operations of reading RAM 38 and ROM 36 and of writing into RAM 38 are repeated n times. When the incoming information for one line, i.e., n bits (corresponding to the number of heating resistors) has been input, the amount of electrical energy to be supplied to each heating resistor for the first printing cycle is stored in RAM 38. In this case, as is clear from the Truth Table (1), codes ($N_1$, $N_2$) for the first cycle will be $N_1=N_2=0$ if $G=0$ or $N_1=N_2=1$ if $G=1$, since energy codes ($M_1$, $M_2$) are always 0 for the first printing cycle.

When the incoming information G of a second line is provided to input terminal 32, a similar operation is repeated; but in this case, since data indicating the amount of electric energy used in the first printing cycle have already been stored in RAM 38, output codes ($O_1$, $O_2$) of ROM 36 are obtained according to Truth Table (1); and these converted codes ($O_1$, $O_2$) are written afresh into RAM 38. Thereafter, exactly the same operation takes place when input occurs of data G of a third and subsequent lines.

Figure 4:
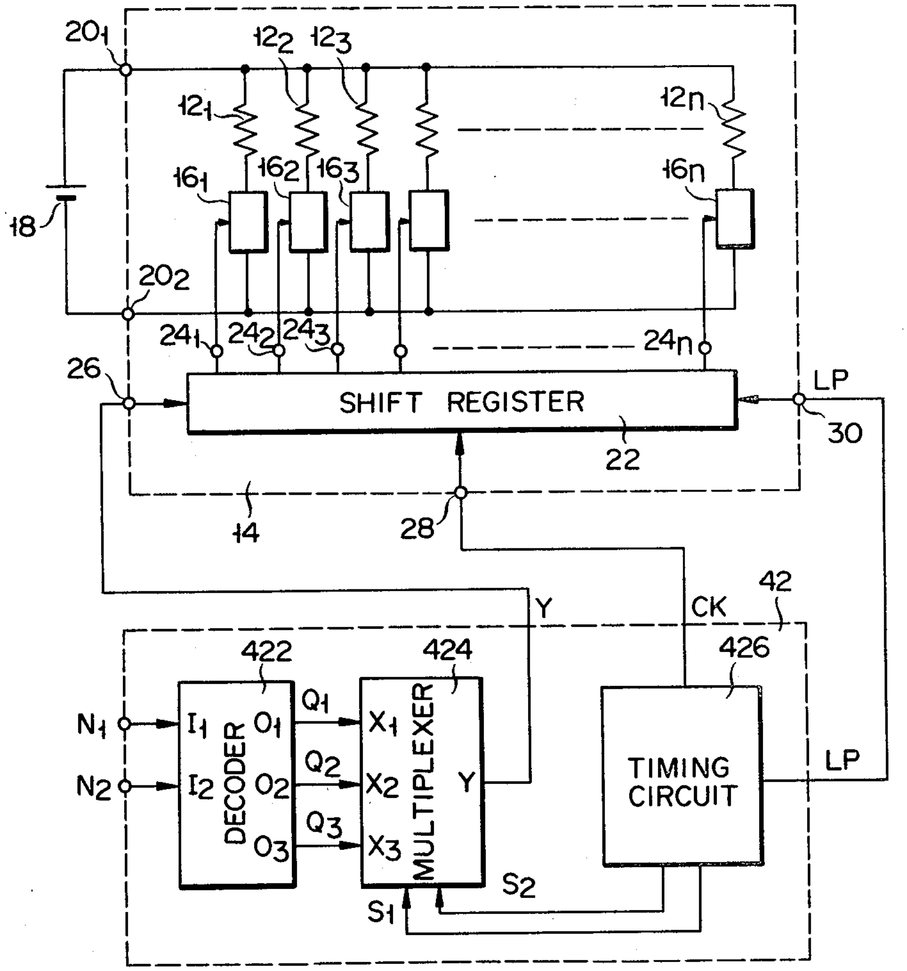
FIG. 4 is a block diagram showing a first control circuit connected to the thermal head of FIG. 1.

Codes ($N_1$, $N_2$) indicating the amount of electrical energy in the coming cycle of printing are supplied to first control circuit 42 for controlling thermal head 44. FIG. 4 shows a block diagram of the first control circuit 42 together with the block diagram of thermal head 44 already shown in FIG. 1. First control circuit 42 comprises a decoder 422, a multiplexer 424 and a timing circuit 426. Decoder 422 converts energy data ($N_1$, $N_2$) supplied from RAM 38 in FIG. 2 into three-bit data words or pulse width codes ($Q_1$, $Q_2$, $Q_3$) according to the following Truth Table (2).

TRUTH TABLE (2)

| $N_1$ | $N_2$ | $Q_1$ | $Q_2$ | $Q_3$ |
|---|---|---|---|---|
| 0 | 0 | 0 | 0 | 0 |
| 1 | 0 | 1 | 0 | 0 |
| 0 | 1 | 0 | 1 | 0 |
| 1 | 1 | 0 | 0 | 1 |

Supplied with one of the pulse width codes ($Q_1$, $Q_2$, $Q_3$), multiplexer 424 selectively outputs gating signals Y. The decision of what to output is carried out following Table (3) under the control of selection signals ($S_1$, $S_2$) supplied from timing control 426.

TABLE (3)

| $S_1$ | $S_2$ | Y |
|---|---|---|
| 0 | 0 | * |
| 1 | 0 | $Q_1$ |
| 0 | 1 | $Q_2$ |
| 1 | 1 | $Q_3$ |

*not used

Figure 5:
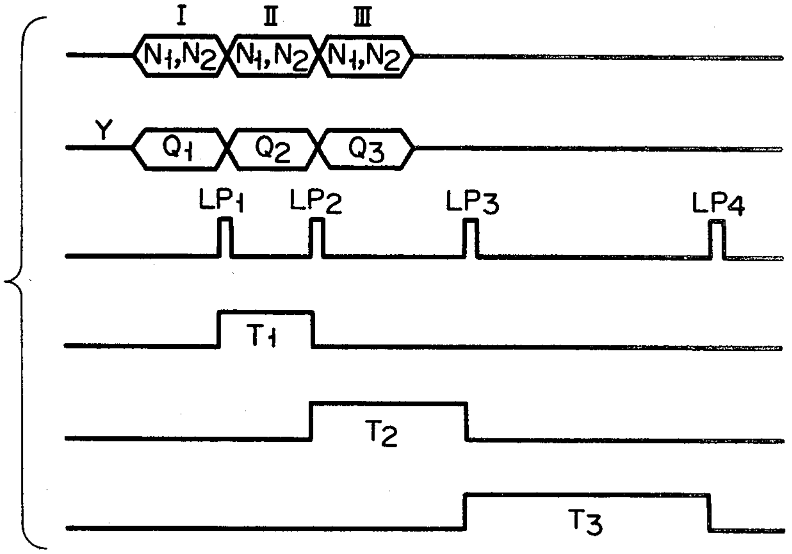
FIG. 5 is a time chart showing the operation of the first control circuit of FIG. 4.

The details of printing will now be explained according to time charts in FIG. 5. For each printing cycle (in which a single line of data is printed on heat sensitive paper), the same n sets of data ($N_1$, $N_2$) indicating the amount of electric energy for each of n heating resistors of the thermal printer are read out 3 times from RAM 38 as shown by I, II and III in FIG. 5. The numbers I, II and III indicate subcycle periods comprising a whole printing cycle for one line of printing data. During the first subcycle period n sets of data ($N_1$, $N_2$) stored in RAM 38 corresponding to one line of printing data are read out and converted into gating signals Y by decoder 422 and multiplexer 424. The first group of gating signals Y, that is corresponding to $Q_1$, is supplied via input terminal 26 to shift register 22. The contents of shift register 22 are shifted in a bit by bit fashion by clock pulse CK from timing circuit 426. In this way all the first gating signals Y (corresponding to $Q_1$) are input into shift register 22, a first latch pulse LP1 is supplied to shift register 22 from timing circuit 426 at the timing shown in FIG. 5. Latch pulse LP1 latches output signals of output terminals $24_1$, $24_2$, - - - $24_n$ of the shift register for the period $T_1$, until a second latch pulse $LP_2$ is supplied as shown in FIG. 5. The output pulse signals $T_1$ which take a value "1" or "0" corresponding to $Q_1$ selectively drive circuits $16_1$, $16_2$, - - - $16_n$ and electric current is supplied from power source 18 to the heating resistors during the period $T_1$. The current is, however, supplied only to those resistors at which the mark data "1" of shift register 22 corresponds to the latched bit. In the second subcycle period, all the data ($N_1$, $N_2$) stored in RAM 38 are read out one by one and converted into pulse width codes ($Q_1$, $Q_2$, $Q_3$) in turn. Since selection signals $S_1$ and $S_2$ are changed to "0" and "1" respectively by timing circuit 426, the second codes $Q_2$ are selected as gating signals Y by multiplexer 424 and stored one by one into shift register 22. When all the signals Y are stored in shift register 22, the output signals of the register are latched by the second latch pulse LP2 for the period $T_2$, which is longer than $T_1$, until the third latch pulse LP3 is supplied as shown in FIG. 5. By this means, current is supplied to the selected heating resistors for the period $T_2$. In the third subcycle period, all the data ($N_1$, $N_2$) are read out from RAM 38 and converted into pulse width codes ($Q_1$, $Q_2$, $Q_3$). Since the selection signals $S_1$ and $S_2$ are both "1", the codes $Q_3$ selected by multiplexer 424. The current is supplied to the selected resistors for the period $T_3$, which is longer than $T_2$, by means of latching by the third latch pulse LP3 until the fourth latch pulse LP4 is supplied as shown in FIG. 5. One cycle of printing has, thus, been completed and another n sets of energy code ($N_1$, $N_2$) are processed in the same manner as mentioned above for the next line of printing. In this way, the same process is repeated for further lines of printing while the heat sensitive paper moves in a direction perpendicular to the lines of printing. It is understood from the Truth Tables (1)-(3) that the relationship between pulse width or current duration $T(i-1)$ and $T(i)$, in the $(i-1)$th and the i th lines of printing respectively, is shown in the following table in which pulse width or current duration $T(i-1)$ and $T(i)$ represent the amount of energy supplied to each heating resistor.

| $T(i-1)$ | $T(i)$ |
|---|---|
| 0 | $T_3$ |
| $T_1$ | $T_2$ |
| $T_2$ | $T_2$ |
| $T_3$ | $T_1$ |

It can be seen from the table that $T(i)$ is increased when $T(i-1)$ is short and $T(i)$ is decreased when $T(i-1)$ is long; whereby uniformity in printing density can be obtained.

Figure 6:
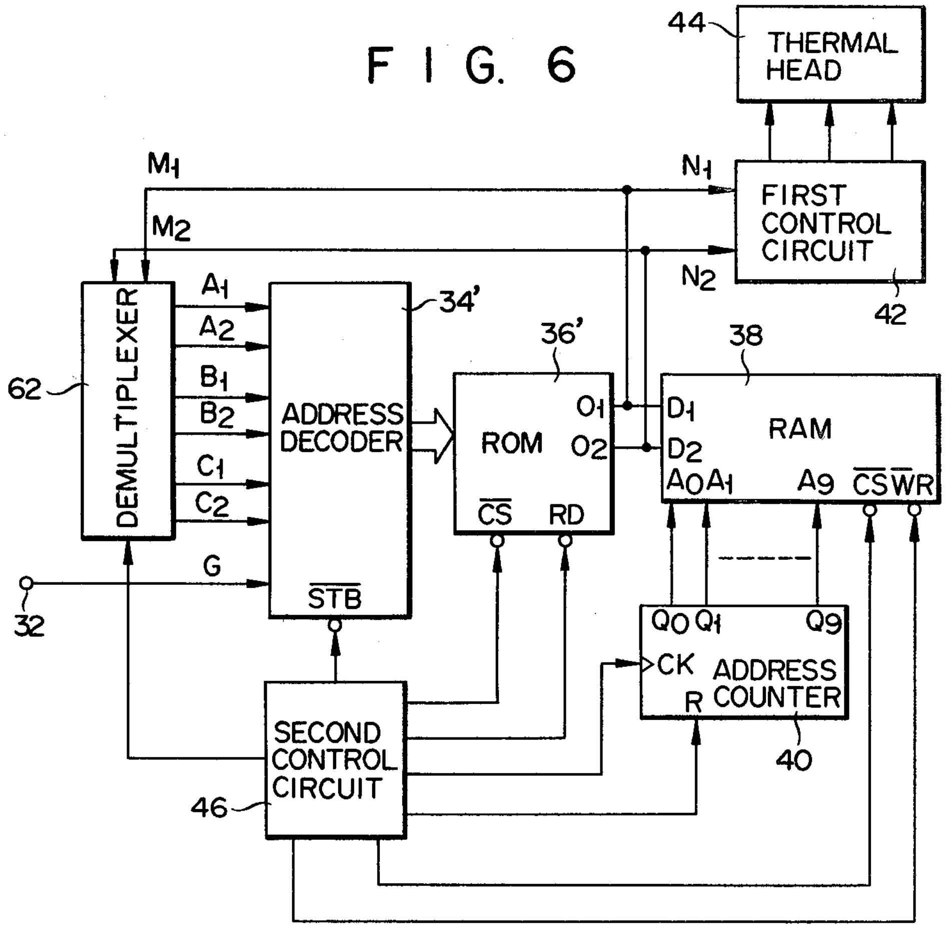
FIG. 6 is a block diagram describing another embodiment of the thermal printer according to the present invention.

FIG. 6 shows another embodiment of the thermal printer in which the amount of energy to be supplied to each heating resistor in the subsequent cycle of printing is determined not only by the amount of energy supplied to that resistor during the previous printing cycle but also by the amount of energy supplied to adjacent resistors during the previous cycle. In a thermal printer for high density printing the heating resistors are also arranged with high density, i.e., 6 per mm or 8 per mm; so when current is actually passed through them, the temperature of each resistor is influenced by heat emitted from those nearby, particularly those next to it. This embodiment has been devised with this point in mind. In FIG. 6, a demultiplexer 62 is added to the block diagram shown in FIG. 2. Energy codes ($M_1$, $M_2$) are read out from RAM 38 and supplied to demultiplexer 62. In this embodiment, not only the energy code for each heating resistor in the previous cycle of printing but also two energy codes for the two adjacent resistors are read out from RAM 38 one by one and distributed to the output terminals $A_1$, $A_2$, $B_1$, $B_2$, $C_1$, $C_2$ of demultiplexer 62. Output terminals ($B_1$, $B_2$) are supplied with the energy code for the resistor under consideration and output terminals ($A_1$, $A_2$) and ($C_1$, $C_2$) are supplied with the energy codes representing the amount of energy supplied to the adjacent resistors. These output codes are supplied to address decoder 34' together with the bit of incoming information to be printed by the corresponding heating resistor. There they are converted to address codes for addressing ROM 36'. ROM 36' stores energy codes which are determined by the input codes $A_1$, $A_2$, $B_1$, $B_2$, $C_1$, $C_2$ and read out at output terminals $O_1$ and $O_2$. The relationship between input codes $A_1$, $A_2$, $B_1$, $B_2$, $C_1$, $C_2$ of address decoder 36' and output code $O_1$, $O_2$ of ROM 36' is shown in the following Truth Table (4).

TRUTH TABLE (4)

| $A_1$ | $A_2$ | $B_1$ | $B_2$ | $C_1$ | $C_2$ | $O_1$ | $O_2$ | $A_1$ | $A_2$ | $B_1$ | $B_2$ | $C_1$ | $C_2$ | $O_1$ | $O_2$ |
|---|---|---|---|---|---|---|---|---|---|---|---|---|---|---|---|
| 0 | 0 | 0 | 0 | 0 | 0 | 1 | 1 | 0 | 0 | 1 | 0 | 0 | 0 | 1 | 1 |
| 0 | 1 | 0 | 0 | 0 | 0 | 1 | 1 | 0 | 1 | 1 | 0 | 0 | 0 | 1 | 0 |
| 1 | 0 | 0 | 0 | 0 | 0 | 1 | 1 | 1 | 0 | 1 | 0 | 0 | 0 | 1 | 0 |
| 1 | 1 | 0 | 0 | 0 | 0 | 1 | 1 | 1 | 1 | 1 | 0 | 0 | 0 | 1 | 0 |
| 0 | 1 | 0 | 0 | 0 | 1 | 1 | 1 | 0 | 1 | 1 | 0 | 0 | 1 | 1 | 0 |
| 0 | 1 | 0 | 0 | 1 | 0 | 1 | 1 | 0 | 1 | 1 | 0 | 1 | 0 | 1 | 0 |
| 0 | 1 | 0 | 0 | 1 | 1 | 1 | 1 | 0 | 1 | 1 | 0 | 1 | 1 | 1 | 0 |
| 1 | 0 | 0 | 0 | 1 | 0 | 1 | 1 | 1 | 0 | 1 | 0 | 1 | 0 | 1 | 0 |
| 1 | 0 | 0 | 0 | 1 | 1 | 1 | 0 | 1 | 0 | 1 | 0 | 1 | 1 | 0 | 1 |
| 1 | 1 | 0 | 0 | 1 | 1 | 1 | 0 | 1 | 1 | 1 | 0 | 1 | 1 | 0 | 1 |
| 0 | 0 | 0 | 1 | 0 | 0 | 1 | 1 | 0 | 0 | 1 | 1 | 0 | 0 | 1 | 0 |
| 0 | 1 | 0 | 1 | 0 | 0 | 1 | 1 | 0 | 1 | 1 | 1 | 0 | 0 | 1 | 0 |
| 1 | 0 | 0 | 1 | 0 | 0 | 1 | 1 | 1 | 0 | 1 | 1 | 0 | 0 | 1 | 0 |
| 1 | 1 | 0 | 1 | 0 | 0 | 1 | 0 | 1 | 1 | 1 | 1 | 0 | 0 | 0 | 1 |
| 0 | 1 | 0 | 1 | 0 | 1 | 1 | 1 | 0 | 1 | 1 | 1 | 0 | 1 | 1 | 0 |
| 0 | 1 | 0 | 1 | 1 | 0 | 1 | 0 | 0 | 1 | 1 | 1 | 1 | 0 | 0 | 1 |
| 0 | 1 | 0 | 1 | 1 | 1 | 1 | 0 | 0 | 1 | 1 | 1 | 1 | 1 | 0 | 1 |
| 1 | 0 | 0 | 1 | 1 | 0 | 1 | 0 | 1 | 0 | 1 | 1 | 1 | 0 | 0 | 1 |
| 1 | 0 | 0 | 1 | 1 | 1 | 1 | 0 | 1 | 0 | 1 | 1 | 1 | 1 | 0 | 1 |
| 1 | 1 | 0 | 1 | 1 | 1 | 1 | 0 | 1 | 1 | 1 | 1 | 1 | 1 | 0 | 1 |

This Table, however, only covers the case where G="1". When G is "0", $O_1$ and $O_2$ are determined always to be "0". Again, $O_1$ and $O_2$ take the same value even when the codes $A_1$, $A_2$ and $C_1$, $C_2$ replace each other.

Figure 7:
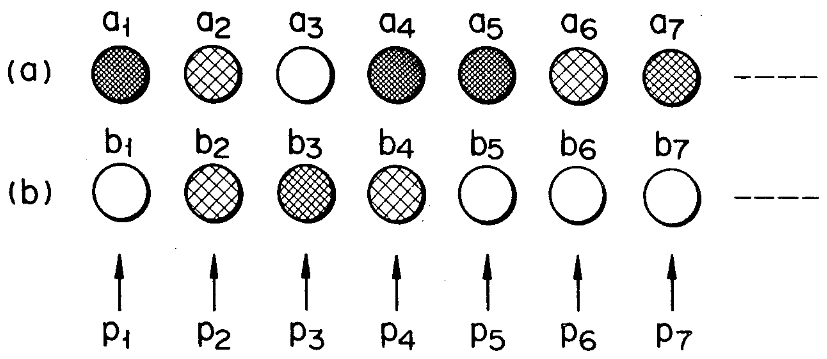
FIG. 7 symbolically illustrates the amounts of energy supplied to several heating resistors of the thermal head.
Figure 8:
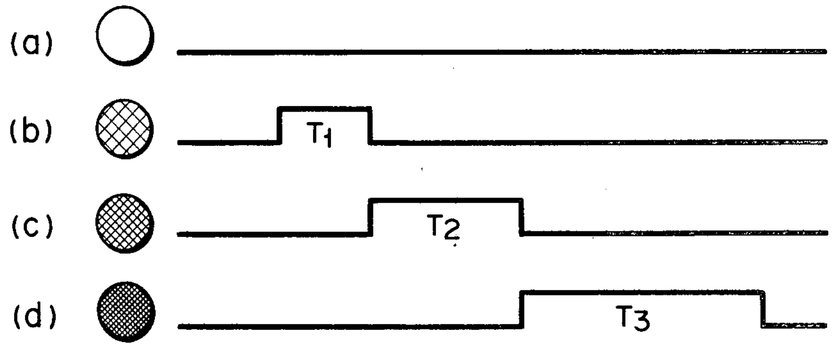
FIG. 8 is a time chart defining the symbols used in FIG. 7.

FIGS. 7 and 8 show the way in which the amounts of energy which should be used for heating resistors in the next cycle of printing are determined. In FIG. 7, circles $a_1$, $a_2$ --- of row (a) represent the amounts of energy used in each heating resistor in the previous cycle of printing. Circles $b_1$, $b_2$, - - - of row (b) represent the amounts of energy to be used in each heating resistor in the coming cycle of printing. Letters $p_1$, $p_2$, - - - represent the positions of heating resistors. In FIG. 8 (*a*)-(*d*), the circles correspond to different current durations $T_1$-$T_3$ representing different amounts of energy. As shown in FIG. 7, the amount of energy $b_3$ to be supplied to the resistor at the position $p_3$ in the coming cycle of printing is determined by taking into consideration the amount of energy $a_2$, $a_3$, $a_4$ for the resistors in positions $p_2$, $p_3$, $p_4$ in the previous cycle of printing. Whereas in the previous embodiment $b_3$ would be selected as the longest pulse width or current duration $T_3$, since the amount of electrical energy $a_3$ for the same heating resistor in the previous cycle of printing is 0 (i.e., T=0), in this embodiment, since the amounts of energy $a_2$, $a_4$ (and particularly $a_4$), in the previous cycle of printing were large, the pulse width or current duration is set at $T_2$, a somewhat shorter time than $T_3$. In this way, the output codes ($O_1$, $O_2$) of ROM 36' are stored into RAM 38 as energy codes ($N_1$, $N_2$) to replace the previous ones which should be supplied to each of n heating resistors in the coming cycle of printing. When all the codes ($N_1$, $N_2$) have been written afresh into RAM 38, printing is carried out by thermal head 44 and first control circuit 42 in the same way as has been already explained in relation to the previous embodiment. Further explanation is, therefore, obviated by referring to the corresponding numbers in FIG. 2.

Figure 9:
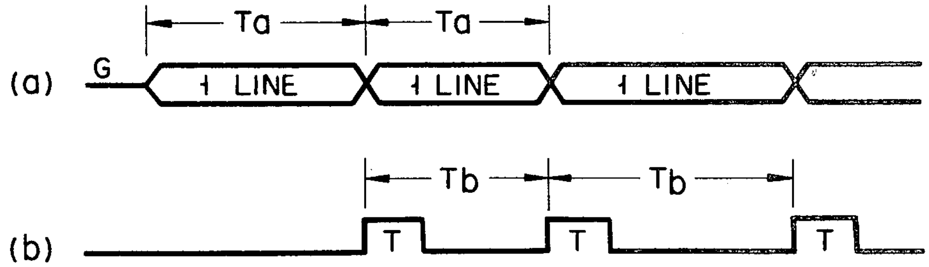
FIG. 9 is a time chart showing transmission times of facsimile picture data.
Figure 10:
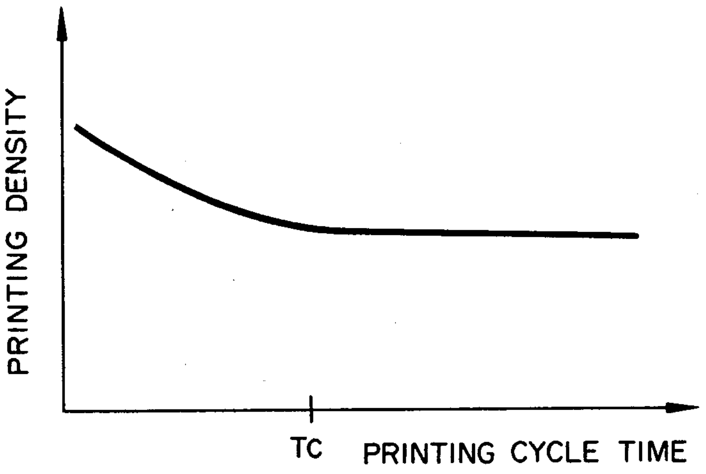
FIG. 10 is a graph of the relationship between printing cycle time and printing density in a thermal printer.
Figure 11:
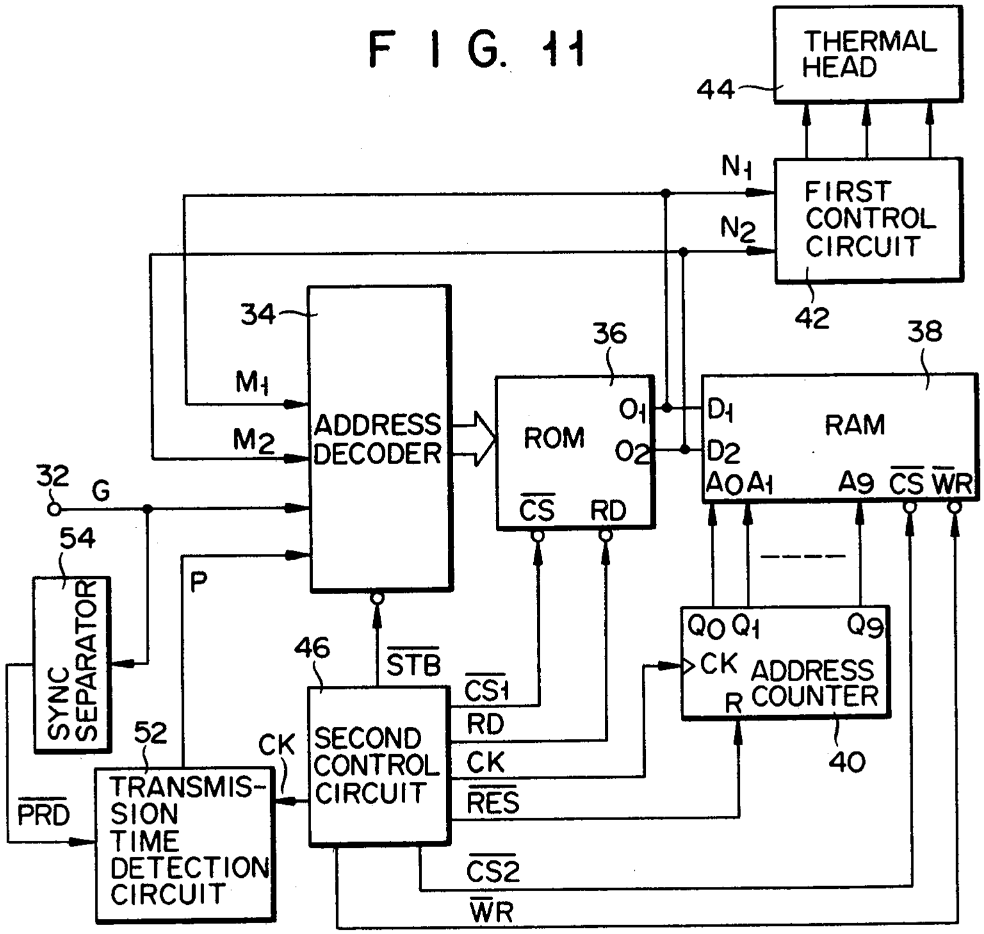
FIG. 11 is a block diagram showing a third embodiment of the thermal printer according to the present invention.
Figure 12:
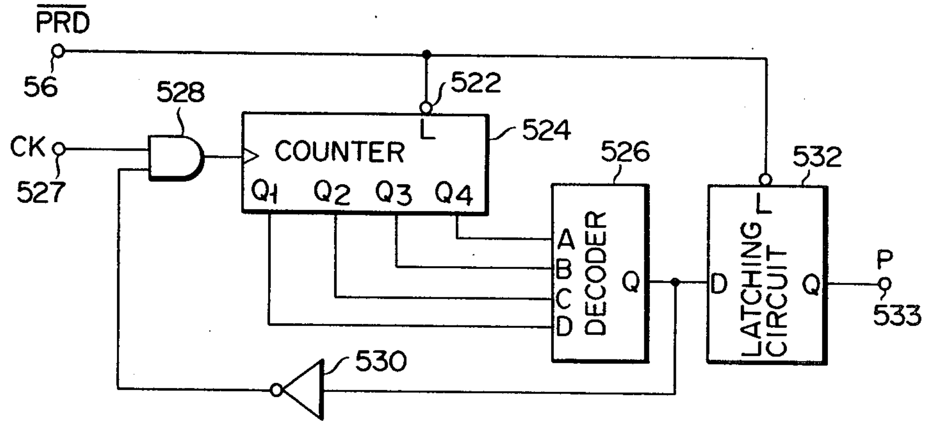
FIG. 12 is a block diagram of an embodiment of the transmission time detection circuit shown in FIG. 11.

FIGS. 9 to 12 show another embodiment according to the invention in which a facsimile signal is supplied to the thermal printer as incoming picture information. In facsimile equipment using digital transmission in which information is compressed in order to increase transmission speed, transmission time $T_a$ for each line of picture data G is liable to change as shown in FIG. 9(*a*). This is one of the factors resulting in lack of uniformity in printing. The reason is that for the picture information G in FIG. 9(*a*), heating resistors of the thermal printer are supplied with current for the periods marked T in FIG. 9(*b*); but if the transmission time $T_a$ changes, the printing cycle time $T_b$ changes also. Now, as shown in FIG. 10, there is a non-linear relationship between printing cycle time and printing density. When the printing cycle time is longer than a given value $T_c$, printing density is more or less constant; but if it is shorter than $T_c$, printing density rises sharply. The reason for this is that, during most of the printing cycle, the heating resistors are cooling off. Only a small fraction of the printing cycle involves supplying current to the resistors. Therefore, the longer the printing cycle, the more time the resistors have to cool and the less dense is the printing, until time $T_c$ is reached. This embodiment has been devised with this point in mind. As shown in FIG. 11, a thermal printer according to this embodiment has a transmission time detection circuit 52 added to the thermal printer system shown in FIG. 2. Incoming facsimile information G is serially input into terminal 32 and supplied to address decoder 34. Information G is also supplied to sync separator 54 which separates, from the picture data, sync signal PRD indicating the position of the start of each line of picture data G. Sync signal PRD is fed to transmission time detection circuit 52, where code P, indicating the transmission time of each line of picture data G, is developed. FIG. 12 shows an example of transmission time detection circuit 52. Sync signal PRD is supplied to a loading terminal 522 of a counter 524 and sets the counter to zero. Decoder 526 provides an output of "0" to an AND gate 528 by providing a "1" to an inverter 530 when counter 524 is set to zero, and opens AND gate 528. Clock pulse CK from second control circuit 46 in FIG. 11 is then supplied to counter 524 via a terminal 527 and AND gate 528. Counter 524 begins to count, and so measures the transmission time of the picture data G. When the contents of counter 524 reach a value corresponding to $T_c$ in FIG. 10, decoder 526 produces an output of "1", and the counter stops. The output of decoder 526 is latched to a latching circuit 532 by the next sync signal PRD. The output signal P of latching circuit 532 is fed from a terminal 533 to address decoder 34 in FIG. 11 together with the energy codes ($M_1$, $M_2$) and picture data G. Consequently, when the transmission time of a particular line of picture data G reaches $T_c$, P becomes "1"; until then, P is "0". Address decoder 34 supplies its output to ROM 36 to designate an address in ROM 36 and an energy code stored at the designated address is read out at its output ($O_1$, $O_2$) in the same manner as already described above. The relationship between the input codes ($M_1$, $M_2$, G, P) to address decoder 34 and output codes ($O_1$, $O_2$) of ROM 36 is shown in the following Truth Table (5).

TRUTH TABLE (5)

| G | P | $M_1$ | $M_2$ | $O_1$ | $O_2$ |
|---|---|---|---|---|---|
| 1 | 0 | 0 | 0 | 1 | 1 |
| 1 | 1 | 0 | 0 | 1 | 1 |
| 1 | 0 | 1 | 0 | 0 | 1 |
| 1 | 1 | 1 | 0 | 0 | 1 |
| 1 | 0 | 0 | 1 | 0 | 1 |
| 1 | 1 | 0 | 1 | 0 | 1 |
| 1 | 0 | 1 | 1 | 1 | 0 |

TRUTH TABLE (5)-continued

| G | P | $M_1$ | $M_2$ | $O_1$ | $O_2$ |
|---|---|---|---|---|---|
| 1 | 1 | 1 | 1 | 0 | 1 |

When G is "0", $O_1$ and $O_2$ are "0". The outputs of ROM 36 are stored in RAM 38 as energy codes ($N_1$, $N_2$) and the same printing process occurs as mentioned above. Further explanation of the embodiment is, therefore, obviated by referring to the corresponding numbers in FIG. 2.

Figure 13:
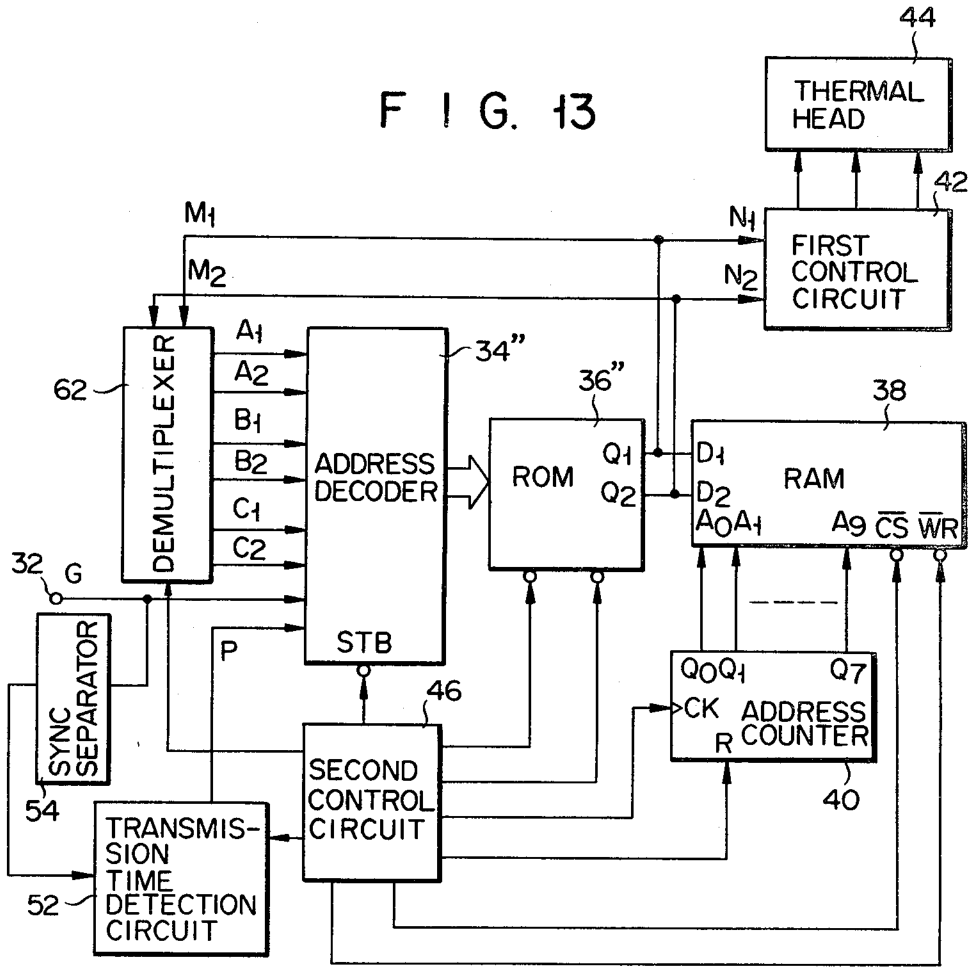
FIG. 13 is a block diagram showing still another embodiment of the thermal printer according to the present invention.

FIG. 13 shows a further embodiment of the thermal printer according to the invention in which the transmission time detecting circuit 52 is added to the thermal printer shown in FIG. 6. In this embodiment, the amount of energy of adjacent heating resistors in the previous printing cycle and the transmission time of picture data for each line are both taken into consideration in determining the amount of energy for each heating resistor in the coming cycle of printing. Address decoder 34" and ROM 36" are so designed that input codes $A_1$, $A_2$, $B_1$, $B_2$, $C_1$, $C_2$, P and data G to address decoder 34" are related to the output code $O_1$, $O_2$ as shown in the following Truth Table (6).

TRUTH TABLE (6)

| P = "1" | | | | | | | | P = "0" | | | | | | | |
|---|---|---|---|---|---|---|---|---|---|---|---|---|---|---|---|
| $A_1$ | $A_2$ | $B_1$ | $B_2$ | $C_1$ | $C_2$ | $O_1$ | $O_2$ | $A_1$ | $A_2$ | $B_1$ | $B_2$ | $C_1$ | $C_2$ | $O_1$ | $O_2$ |
| 0 | 0 | 0 | 0 | 0 | 0 | 1 | 1 | 0 | 0 | 0 | 0 | 0 | 0 | 1 | 1 |
| 0 | 1 | 0 | 0 | 0 | 0 | 1 | 1 | 0 | 1 | 0 | 0 | 0 | 0 | 1 | 1 |
| 1 | 0 | 0 | 0 | 0 | 0 | 1 | 1 | 1 | 0 | 0 | 0 | 0 | 0 | 1 | 1 |
| 1 | 1 | 0 | 0 | 0 | 0 | 1 | 1 | 1 | 1 | 0 | 0 | 0 | 0 | 1 | 1 |
| 0 | 1 | 0 | 0 | 0 | 1 | 1 | 1 | 0 | 1 | 0 | 0 | 0 | 1 | 1 | 1 |
| 0 | 1 | 0 | 0 | 1 | 0 | 1 | 1 | 0 | 1 | 0 | 0 | 1 | 0 | 1 | 1 |
| 0 | 1 | 0 | 0 | 1 | 1 | 1 | 1 | 0 | 1 | 0 | 0 | 1 | 1 | 1 | 1 |
| 1 | 0 | 0 | 0 | 1 | 0 | 1 | 1 | 1 | 0 | 0 | 0 | 1 | 0 | 1 | 1 |
| 1 | 0 | 0 | 0 | 1 | 1 | 1 | 0 | 1 | 0 | 0 | 0 | 1 | 1 | 1 | 1 |
| 1 | 1 | 0 | 0 | 1 | 1 | 1 | 0 | 1 | 1 | 0 | 0 | 1 | 1 | 1 | 1 |
| 0 | 0 | 0 | 1 | 0 | 0 | 1 | 1 | 0 | 0 | 0 | 1 | 0 | 0 | 1 | 1 |
| 0 | 1 | 0 | 1 | 0 | 0 | 1 | 1 | 0 | 1 | 0 | 1 | 0 | 0 | 1 | 1 |
| 1 | 0 | 0 | 1 | 0 | 0 | 1 | 1 | 1 | 0 | 0 | 1 | 0 | 0 | 1 | 1 |
| 1 | 1 | 0 | 1 | 0 | 0 | 1 | 0 | 1 | 1 | 0 | 1 | 0 | 0 | 1 | 1 |
| 0 | 1 | 0 | 1 | 0 | 1 | 1 | 1 | 0 | 1 | 0 | 1 | 0 | 1 | 1 | 1 |
| 0 | 1 | 0 | 1 | 1 | 0 | 1 | 0 | 0 | 1 | 0 | 1 | 1 | 0 | 1 | 1 |
| 0 | 1 | 0 | 1 | 1 | 1 | 1 | 0 | 0 | 1 | 0 | 1 | 1 | 1 | 1 | 0 |
| 1 | 0 | 0 | 1 | 1 | 0 | 1 | 0 | 1 | 0 | 0 | 1 | 1 | 0 | 1 | 0 |
| 1 | 0 | 0 | 1 | 1 | 1 | 1 | 0 | 1 | 0 | 0 | 1 | 1 | 1 | 1 | 0 |
| 1 | 1 | 0 | 1 | 1 | 1 | 1 | 0 | 1 | 1 | 0 | 1 | 1 | 1 | 1 | 0 |
| 0 | 0 | 1 | 0 | 0 | 0 | 1 | 1 | 0 | 0 | 1 | 0 | 0 | 0 | 1 | 1 |
| 0 | 1 | 1 | 0 | 0 | 0 | 1 | 0 | 0 | 1 | 1 | 0 | 0 | 0 | 1 | 0 |
| 1 | 0 | 1 | 0 | 0 | 0 | 1 | 0 | 1 | 0 | 1 | 0 | 0 | 0 | 1 | 0 |
| 1 | 1 | 1 | 0 | 0 | 0 | 1 | 0 | 1 | 1 | 1 | 0 | 0 | 0 | 1 | 0 |
| 0 | 1 | 1 | 0 | 0 | 1 | 1 | 0 | 0 | 1 | 1 | 0 | 0 | 1 | 1 | 0 |
| 0 | 1 | 1 | 0 | 1 | 0 | 1 | 0 | 0 | 1 | 1 | 0 | 1 | 0 | 1 | 0 |
| 0 | 1 | 1 | 0 | 1 | 1 | 1 | 0 | 0 | 1 | 1 | 0 | 1 | 1 | 1 | 0 |
| 1 | 0 | 1 | 0 | 1 | 0 | 1 | 0 | 1 | 0 | 1 | 0 | 1 | 0 | 1 | 0 |
| 1 | 0 | 1 | 0 | 1 | 1 | 0 | 1 | 1 | 0 | 1 | 0 | 1 | 1 | 1 | 0 |
| 1 | 1 | 1 | 0 | 1 | 1 | 0 | 1 | 1 | 1 | 1 | 0 | 1 | 1 | 1 | 0 |
| 0 | 0 | 1 | 1 | 0 | 0 | 1 | 0 | 0 | 0 | 1 | 1 | 0 | 0 | 1 | 0 |
| 0 | 1 | 1 | 1 | 0 | 0 | 1 | 0 | 0 | 1 | 1 | 1 | 0 | 0 | 1 | 0 |
| 1 | 0 | 1 | 1 | 0 | 0 | 1 | 0 | 1 | 0 | 1 | 1 | 0 | 0 | 1 | 0 |
| 1 | 1 | 1 | 1 | 0 | 0 | 0 | 1 | 1 | 1 | 1 | 1 | 0 | 0 | 1 | 0 |
| 0 | 1 | 1 | 1 | 0 | 1 | 1 | 0 | 0 | 1 | 1 | 1 | 0 | 1 | 1 | 0 |
| 0 | 1 | 1 | 1 | 1 | 0 | 0 | 1 | 0 | 1 | 1 | 1 | 1 | 0 | 1 | 0 |
| 0 | 1 | 1 | 1 | 1 | 1 | 0 | 1 | 0 | 1 | 1 | 1 | 1 | 1 | 0 | 1 |
| 1 | 0 | 1 | 1 | 1 | 0 | 0 | 1 | 1 | 0 | 1 | 1 | 1 | 0 | 0 | 1 |
| 1 | 0 | 1 | 1 | 1 | 1 | 0 | 1 | 1 | 0 | 1 | 1 | 1 | 1 | 0 | 1 |
| 1 | 1 | 1 | 1 | 1 | 1 | 0 | 1 | 1 | 1 | 1 | 1 | 1 | 1 | 0 | 1 |

In FIG. 13, parts are numbered correspondingly to those in FIGS. 6 and 11 and the description accompanying those figures will suffice to explain the embodiment.

Figure 14:
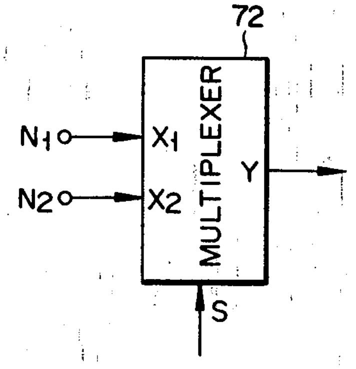
FIG. 14 depicts a modification of the multiplexer shown in FIG. 4.
Figure 15:
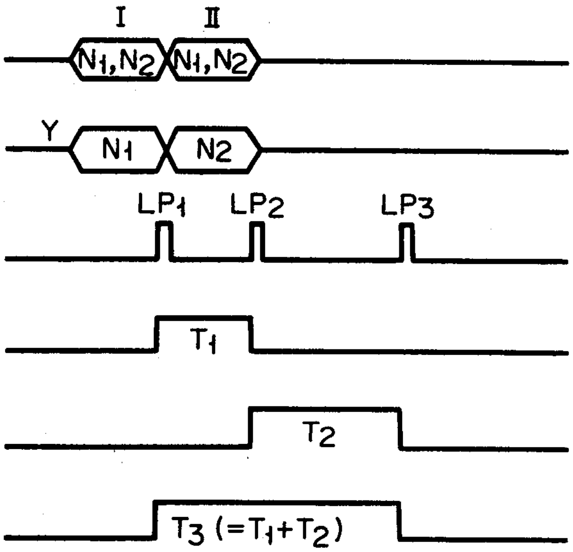
FIG. 15 is a time chart showing the operation of the thermal printer in the embodiment of FIG. 14.

It should be noted that there can be many modifications within the scope of the invention. A 2-input multiplexer 72, shown in FIG. 14, can be substituted for decoder 422 and multiplexer 424 in FIG. 4. In this case, one cycle of printing for one line is divided into two subcycle periods (I and II) in each of which energy code ($N_1$, $N_2$) is read out as shown in FIG. 15 and supplied to the inputs of multiplexer 72. Multiplexer 72 is controlled by selection signal S so that in the first subcycle period the code data $N_1$, and in the second subcycle period the code data $N_2$, are selected as its gating signal Y and supplied to input terminal 26 of shift register 22 in FIG. 4. When all the code data $N_1$ for each heating resistor are stored in shift register 22 during subcycle period I, latch pulse LP1 latches the output signals of the shift register for $T_1$ until latch pulse LP2 is applied to the shift register. By this means, selected heating resistors are supplied with current for the time period $T_1$ as shown in FIG. 15. In subcycle period II, code data $N_2$ are stored in shift register 22 and output signals of the shift register 22 are latched during the time period of $T_2$ by latch pulses LP2 and LP3. By this means, selected heating resistors are supplied with current for the time period $T_2$. In this case when the energy codes $N_1$, $N_2$ are both "1" current is supplied during both time periods $T_1$ and $T_2$. The energy code ($N_1$, $N_2$), therefore, can provide three different amounts of energy, $T_1$, $T_2$ and $T_1+T_2$ corresponding to the codes (1, 0), (0, 1) and (1,1), giving the same results as previously. The advantage of this variation is that printing time is reduced, since a single printing cycle lasts only from LP1 to LP3 and not from LP1 to LP4, as before. The different time periods during which energy is supplied to the heating resistors may therefore overlap. For example, time periods $T_1$ and $T_3$ are overlapping time periods. Also, $T_2$ and $T_3$ are overlapping time periods. $T_1$ and $T_2$, however, do not overlap.

Figure 16:
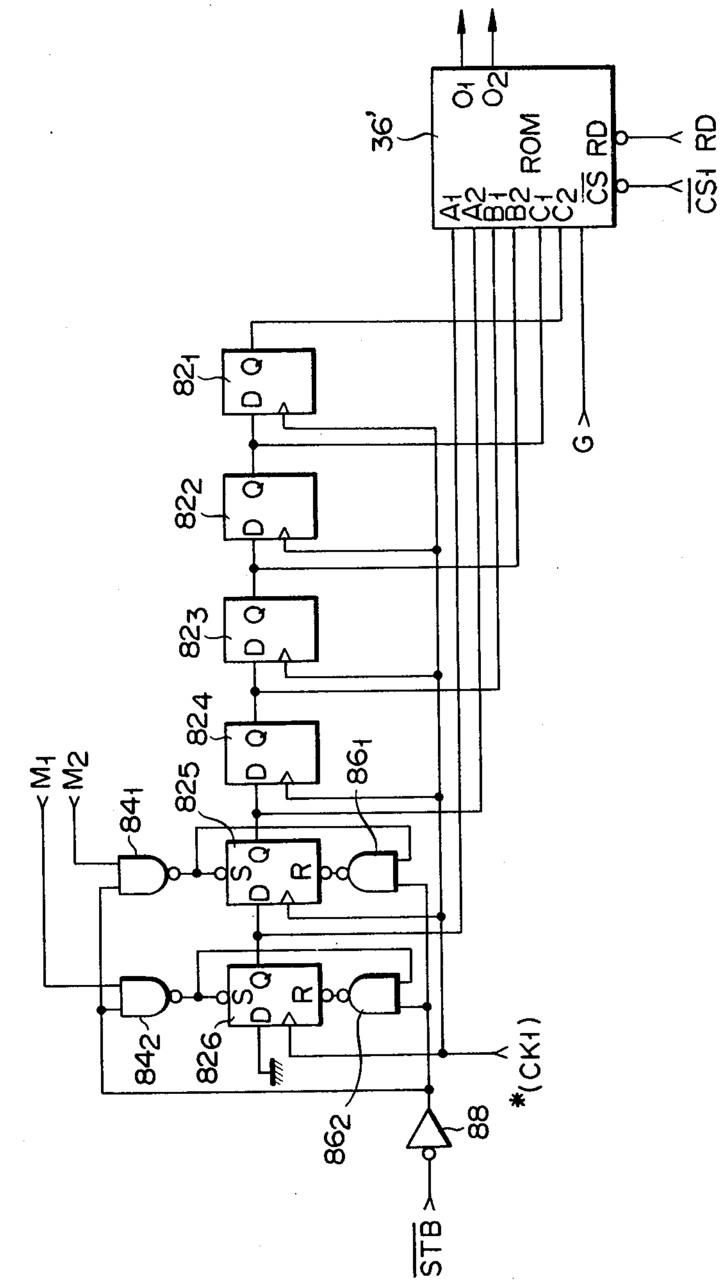
FIG. 16 is a block diagram of a modification of the thermal printer shown in FIG. 6.

Demultiplexer 62 and address decoder 34' in FIG. 6 can be replaced by an address decoder shown in FIG. 16. The decoder includes six flip-flop circuits $82_1$, - - - $82_6$ which are connected in series to form a shift register. Energy codes ($M_1$, $M_2$) in the previous cycle of printing are supplied from RAM 38 to flip-flops $82_5$ and $82_6$ via NAND gates $84_1$ and $84_2$. These NAND gates $84_1$ and $84_2$ are controlled together with another set of NAND gates $86_1$ and $86_2$ by strobe signal STB from second control circuit 46 of FIG. 6, via inverter 88. Strobe signal STB opens NAND gates $84_1$, $84_2$, $86_1$, $86_2$ to write the energy code ($M_1$, $M_2$) into a set of flip-flops $82_5$, $82_6$. Operation of this address decoder is now explained taking as an example a case in which the amount of energy $b_3$ which should be supplied to a heating resistor at the position $p_3$ in FIG. 7 is determined. At first, energy code ($M_1$, $M_2$) representing $a_2$ for the resistor at position $p_2$ in FIG. 7(*a*) is read out from RAM 38 and written into flip-flops $82_5$ and $82_6$ by strobe signal STB. Then clock signal CK1 from second control circuit 46 in FIG. 6 is supplied to all the flip-flops to shift the code ($M_1$, $M_2$) into flip-flops $82_3$, $82_4$. Second, the energy code ($M_1$, $M_2$) representing $a_3$ for the resistor at position $p_3$ is read out from RAM 38 and written into flip-flops $82_5$, $82_6$ by the next strobe signal STB. Again clock signal CK1 is supplied to shift the codes ($M_1$, $M_2$) stored in flip-flops $82_3$, $82_4$ and $82_5$, $82_6$ to the next pair of flip-flops $82_1$, $82_2$ and $82_3$, $82_4$ in turn. Finally, energy code ($M_1$, $M_2$) representing $a_4$ for the resistor at position $p_4$ is read out from RAM 38 and is written into the pair of flip-flops $82_5$, $82_6$. At this time three sets of energy codes ($M_1$, $M_2$) have been stored in the three pairs of flip-flops. Output signals of each flip-flop $A_1$, $A_2$, $B_1$, $B_2$, $C_1$, $C_2$ and a bit of incoming information G to be printed in the coming cycle of printing by the heating resistor at position $p_3$ are supplied to ROM 36' to address. At the output terminals $O_1$, $O_2$ of ROM 36' the new energy code ($O_1$, $O_2$) is provided representing $b_3$ for the resistor at position $p_3$.

Figure 17:
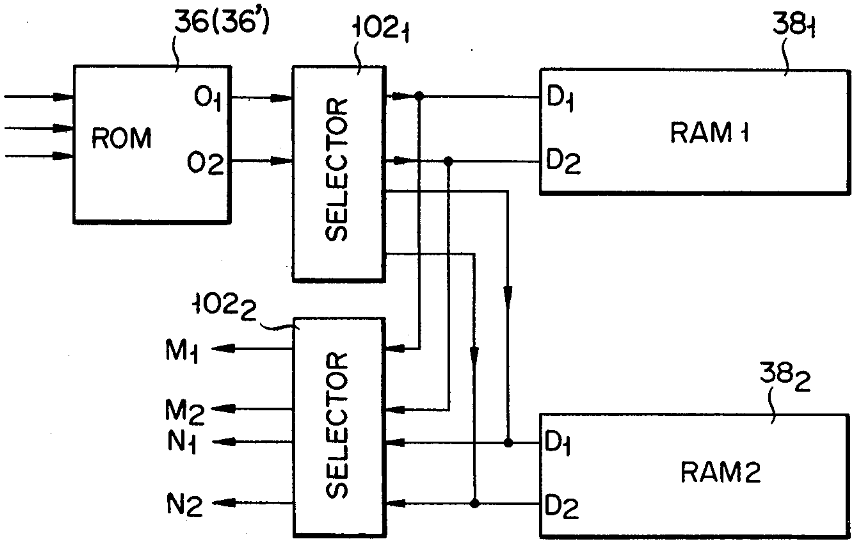
FIG. 17 is a block diagram of an alternate form of memory for the present invention.

In the embodiments mentioned above, although only one RAM 38 is used, it is also possible to use two RAMs 38$_1$, 38$_2$ as shown in FIG. 17.

In FIG. 17, energy code $M_1$, $M_2$ is read first from RAM 38$_1$ via a selector 102$_2$ and supplied to address decoder 34 (in FIG. 2) or demultiplexer 62 (in FIG. 6) in a given printing cycle. After that, the output code of ROM 36 in FIG. 2 (or 36' in FIG. 6) is written, via selector 102$_1$, into RAM 38$_1$ as the energy code ($N_1$, $N_2$). Energy code ($N_1$, $N_2$) is read from another RAM 38$_2$ via selector 102$_2$ and supplied to first control circuit 42 in FIGS. 2 or 6. Then, in the next printing cycle, codes ($M_1$, $M_2$) are read from RAM 38$_2$, converted by ROM 36 or 36' and rewritten into RAM 38$_2$ via selector 102$_1$. Energy code ($N_1$, $N_2$) is read out from RAM 38$_1$ and supplied to the first control circuit 42. The two RAMs are therefore used alternately to provide either the energy code for the preceding printing cycle, $M_1$, $M_2$, or the energy code for the next cycle, $N_1$, $N_2$. For example, if the energy code ($N_1$, $N_2$) for the current printing cycle is stored in RAM 38$_1$, the next printing cycle's energy code ($N_1$, $N_2$) will be stored in RAM 38$_2$. When the next printing cycle arrives, the data stored in RAM 38$_1$ is read out as energy codes ($M_1$, $M_2$) for the previous printing cycle and used to determine energy codes ($N_1$, $N_2$) for the present cycle.

It can be seen from the embodiment illustrated in FIG. 17, that determining amounts of electrical energy for the coming cycle of printing based on codes ($M_1$, $M_2$) of the previous cycle, and reading the codes ($N_1$, $N_2$) for the coming cycle, occur simultaneously. This is very suitable for cases when picture data are input in a continuous time series, as in facsimile receiving equipment.

The means of controlling the amount of electrical energy need not be limited to variation of the current duration or pulse width; it is equally possible, for example, to vary the voltage or current applied to the heating resistors.

Figure 18:
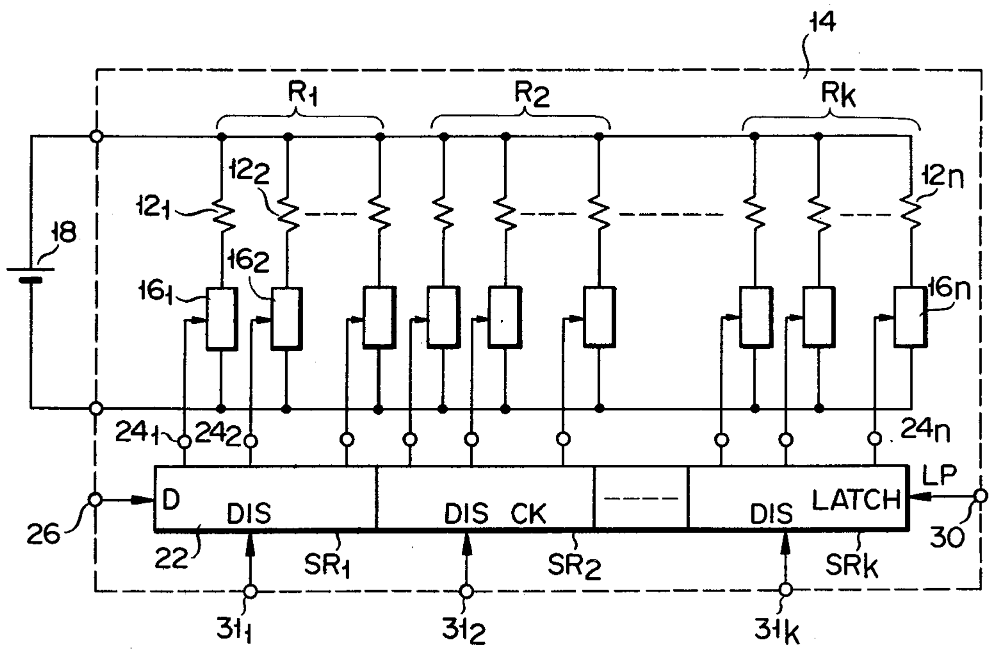
FIG. 18 is a block diagram showing a modification of the thermal head of the invention.

Shift register 22 shown in FIGS. 1 and 4 can be divided into several groups $SR_1$–$SR_k$ with control terminals 31$_1$, 31$_2$, - - - 31$_k$ controlling the output from each group as shown in FIG. 18. By supplying signals into these terminals 31$_1$, 31$_2$ - - - 31$_k$ in turn, heating resistors can be driven in groups instead of all at once. Further, the shift register 22 can be replaced by an ordinary diode matrix system.

The invention still can be put into practice in various other forms. A shift register can be used instead of the RAM as a means of storing the codes representing amounts of electrical energy.

The data indicating the amount of electrical energy can also be encoded by a number of bits greater than 2.

Although illustrative embodiments of the invention have been described in detail with reference to the accompanying drawings, it is to be understood that the invention is not limited to those precise embodiments and that various changes and modifications may be effected therein by one skilled in the art without departing from the scope or spirit of the invention.

We claim:

1. A thermal printer for printing information on heat-sensitive paper during a plurality of printing cycles, said thermal printer comprising:

a plurality of heating elements;

power supply means for supplying said heating elements with electrical power;

control means connected between said heating elements and said power supply means for controlling the amount of electrical power supplied to each one of said heating elements in accordance with an energy code for each heating element;

energy code means connected to said control means for generating an energy code for each heating element in response to the incoming information signal for said heating element and the previous energy code for said heating element generated by said energy code means during the previous printing cycle, said energy code means comprising logic memory means connected to said control means for storing energy codes at fixed addresses and an address decoder connected to said logic memory means to convert the incoming information signal and the previous energy code for each heating element to an address for said heating element, said energy code means supplying the address to said logic memory means to look up the energy code stored in said logic memory means; and a RAM connected to said logic memory means and said address decoder for storing the energy codes generated by said energy code means, said RAM supplying the energy codes to said energy code means during the next printing cycle as the previous energy codes.

2. A thermal printer as claimed in claim 1 wherein said thermal printer further comprises a second control means connected to said RAM, said logic memory means and said address decoder for controlling the transfer of energy codes between said energy code means and said control means.

3. A thermal printer for printing information on heat-sensitive paper during a plurality of printing cycles, said thermal printer comprising:

a plurality of heating elements;

power supply means for supplying said heating elements with electrical power;

control means connected between said heating elements and said power supply means for controlling the amount of electrical power supplied to each one of said heating elements in accordance with an energy code for each heating element;

energy code means connected to said control means for generating an energy code for each heating element in response to (a) the incoming information signal for said heating element, (b) the previous energy code for said heating element generated by said energy code means during the previous printing cycle, and (c) the previous adjacent energy codes for heating elements adjacent to said heating element generated by said energy code means during the previous printing cycle; and memory means connected to said energy code means for storing the energy codes generated by said energy code means, said memory means supplying the energy codes to said energy code means during the next printing cycle as the previous energy codes.

4. A thermal printer as claimed in claim 3 wherein said memory means comprises a RAM and said energy code means comprises:

logic memory means connected to said control means and said RAM for storing energy codes at fixed addresses; and an address decoder connected to said RAM and said logic memory means to convert the incoming information signal, the previous energy code for each heating element, and the previous adjacent energy codes to an address for said heating element, said energy code means supplying the address to said logic memory means to look up the energy code stored in said logic memory means.

5. A thermal printer as claimed in claim 4 wherein said address decoder comprises:

at least three pairs of flip-flop circuits connected to said logic memory means and arranged as a shift register to shift the contents of each pair of flip-flop circuits from one to another; and a pair of input gates connected between said RAM and the first of said pair of flip-flop circuits to input to said first pair of flip-flop circuits energy codes from said RAM.

6. A thermal printer as claimed in claim 4 wherein said energy code means further comprises a demultiplexer connected between said RAM and said address decoder to receive the previous energy codes and the previous adjacent energy codes for said heating elements and supply the previous energy codes and the previous adjacent energy codes to said address decoder.

7. A thermal printer for printing information on heat-sensitive paper during a plurality of printing cycles, said thermal printer comprising:

a plurality of heating elements;

power supply means for supplying said heating elements with electrical power;

control means connected between said heating elements and said power supply means for controlling the amount of electrical power supplied to each one of said heating elements in accordance with an energy code for each heating element;

energy code means connected to said control means for generating an energy code for each heating element in response to (a) the incoming information signal for said heating element, (b) the previous energy code for said heating element generated by said energy code means during the previous printing cycle, (c) the previous adjacent energy codes for heating elements adjacent to said heating element, and (d) the transmission time of the information in the previous printing cycle; and memory means connected to said energy code means for storing the energy codes generated by said energy code means, said memory means supplying the energy codes to said energy code means during the next printing cycle as the previous energy codes.

8. A thermal printer for printing information on heat sensitive paper during a plurality of printing cycles, said thermal printer comprising:

a plurality of heating elements;

power supply means for supplying said heating elements with electrical power;

a drive circuit connected to each heating element and said power supply means to drive said heating element;

a shift register connected to said drive circuits to selectively actuate said drive circuits;

a first control circuit connected to said shift register to control said shift register in accordance with an energy code for each heating element;

memory means for storing the energy codes;

energy code means connected to said memory means and said first control circuit for generating an energy code for each heating element during each printing cycle in response to an input signal, said input signal including an incoming information signal for said heating element and an energy code generated by said energy code means for said heating element during the preceding printing cycle and stored in said memory means; and a second control circuit connected to said energy code means and said memory means to control the transmission of energy codes between said memory means and said energy code means and to control the transmission of energy codes from said energy code means to said first control circuit.

9. A thermal printer as claimed in claim 8 wherein the input signal to said energy code means further includes energy codes generated by said energy code means during the preceding printing cycle for heating elements adjacent to said heating element.

10. A thermal printer as claimed in claim 8 wherein the input signal to said energy code means further comprises a signal representing the transmission time of the information in the preceding printing cycle.

11. A thermal printer as claimed in claim 8, 9, or 10 wherein said control means comprises:

conversion means responsive to the energy codes for generating at least two sets of gating signals; and timing means connected to said conversion means for enabling said conversion means to successively couple the sets of gating signals to said shift register, said timing means further latching the set of gating signals stored in said shift register to said drive circuits to drive said heating elements for a predetermined period of time.

12. A thermal printer as claimed in claim 11 wherein said timing means generates a first latch pulse to latch a first set of gating signals from said shift register to said drive circuits for a first time period and a second latch pulse to latch a second set of gating signals from said shift register to said drive circuits for a second time period.

* * * * *